July 11, 1950  R. J. COOPER  2,514,374
PIPE JACK
Filed Sept. 14, 1944
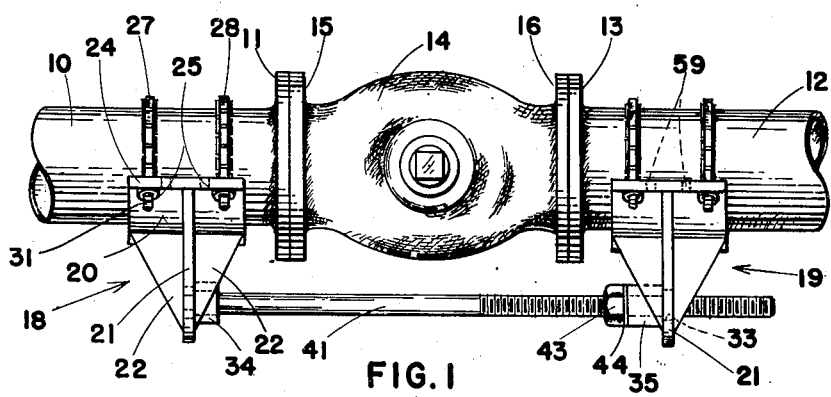
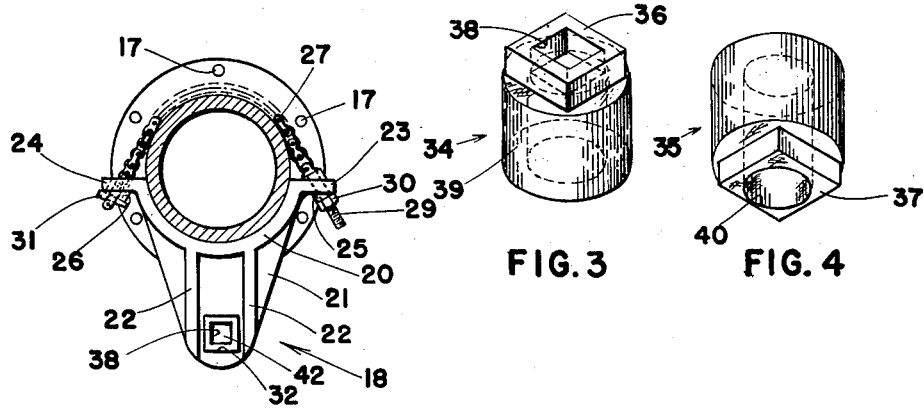
Inventor
ROSS J. COOPER
By W. Glenn Jones
Attorney Patented July 11, 1950

2,514,374

UNITED STATES PATENT OFFICE 2,514,374

PIPE JACK

Ross J. Cooper, Toledo, Ohio

Application September 14, 1944, Serial No. 554,139

3 Claims. (Cl. 254—100)

(Granted under the act of March 3, 1883, as amended April 30, 1928; 370 O. G. 757)

This invention relates to improvements in a pipe fitting tool and more particularly to a device used to separate flanged joints in steam lines and the like.

The joints in pipe lines, particularly those carrying high pressure and high temperature steam, are subject to freezing, that is to say, they are difficult to break or separate, and make the removal of valves, pipes and other parts very difficult. Such joints usually comprise the flanged ends of a pair of pipes in axially abutting relation with a gasket therebetween. Heretofore the practice has been to drive a cold chisel in the joint desired to be separated in order to break it free. This invariably damages the abutting surfaces of the flanges, requiring the refinishing thereof before they can be rejoined, and destroys the gasket.

The present invention has for its object the provision of means for breaking flanged pipe joints without damage thereto.

It is a further object of this invention to provide a tool for axially separating frozen joints in pipe lines.

It is a further object of this invention to provide a tool for separating joints in pipe lines with interchangeable parts capable of use in a variety of ways.

According to the invention two pipe clamps are adapted to be fastened to the pipe, one on each side of the joints to be separated. A rod has one end stepped on one clamp while the other is threaded and carries a nut bearing on the other clamp. By turning the nut a force is applied to the clamps and the pipes to which they are attached in a direction tending to break the joint without damage to the abutting surfaces. The axial movement of the pipe is absorbed in the expansion joints and angles in the pipe line normally provided to take care of heat expansion in such lines. Each clamp is provided with an arm having an aperture of the same size. The rod is stepped in the aperture or permitted to pass therethrough by use of bushings, thus rendering the clamps interchangeable and permitting a degree of flexibility in use not heretofore found in tools of this type.

Fig. 1 is a side view of one embodiment of the invention shown applied to a pipe line for removing a valve therein; Fig. 2 is a view of the device as seen from the left end of Fig. 1; Fig. 3 is a perspective view of the upper bushing drawn on a larger scale; and Fig. 4 is a similar view of the lower bushing.

Referring more particularly to the drawings, Figs. 1 to 4, a pipe line is represented by parts of two sections of pipe 10 and 12 whose ends are provided with flanges 11 and 13 between which is mounted the valve casing 14 also provided with flanges 15 and 16 which are adapted to be bolted to the corresponding pipe flanges by means of bolts (not shown) passing through aligned apertures 17 in the flanges.

The tool for separating these flanges to permit removal of the valve casing comprises a pair of pipe clamps 18 and 19. Each clamp comprises a semicircular saddle 20, adapted to seat on a pipe, and an arm 21 integral therewith projecting laterally therefrom. Spaced reinforcing webs 22 connect the upper and lower sides of the arm 21 to the member 20. The saddle 20 has flanges 23 and 24 projecting from the vertical edges thereof in an approximately radial direction. Bosses 25 and 26, through which apertures are drilled, are provided on each flange. Chains 27 and 28, adapted to pass around the pipe, are attached to a threaded stud 29 at one end. This stud passes through bosses 25 and carries a nut 30 for adjusting the fit of the chain around the pipe. The other end of the chain passes through the aperture in boss 26 where it is secured by means of a wedge 31 driven between the links thereof. The flanges also carry bolt holes 59 for a purpose subsequently described. The inner face of the saddle 20 adjacent the pipe may be roughened to prevent slipping.

The arms 21 are each provided with a square aperture 32 and 33 between the webs 22 and adjacent the end of the arm. Bushings 34 and 35, having squared ends 36 and 37, Figs. 3 and 4, seat in these apertures and are thereby prevented from turning. The squared end 36 of bushing 34 has a square aperture 38 therein while the cylindrical portion 39 has a cylindrical bore. Bushing 35 has a cylindrical bore 40 extending the length thereof. The use of these bushings permits the clamps to be interchangeable, as the square apertures in the arms are the same size in each clamp and permits the rod to be stepped in either arm.

The rod 41 is of a diameter slightly less than the cylindrical bores in bushings 34 and 35 and has a squared end 42 to fit aperture 38 in the bushing 34 in which it is stepped thus preventing turning of the rod about its longitudinal axis. The other end of the rod is threaded and passes through the bore 40 of the bushing 35. A nut 43, threaded on the rod 41, bears on a washer 44 which in turn rests on bushing 35 and is adapted to be turned by any suitable means such as a wrench.

It will be understood that with the pipe clamps 18 and 19 affixed to the pipes 10 and 11 and the rod 41 bearing against the arms of the clamps by means of the bushings, turning of the nut 43 in the proper direction will produce a force acting on the pipes tending to separate the flanges 11 and 15, and 13 and 16.

While I have described the preferred form of my invention I do not wish to limit myself to the precise details shown, but wish to avail myself of such variations and modifications as may come within the scope of the appended claims.

The invention described herein may be manufactured and used by or for the government of the United States of America for governmental purposes without the payment of any royalties thereon or therefor.

I claim:

1. In a tool for separating frozen pipe joints, a pair of clamps, each thereof comprising a saddle, means adapted to fasten said saddle on a pipe, an arm integral with said saddle extending laterally therefrom, said arm having a square aperture therein, a threaded rod having a squared end, a first bushing having a square apertured end seating in said aperture in said arm, said squared end of said rod stepped in said bushing, a second bushing having a square end seating in said aperture in said other arm, said threaded rod passing through said second bushing, and a nut threaded on said rod between said arms bearing against said second bushing.

2. A tool for separating frozen pipe joints, a pair of clamps, each thereof comprising a saddle, means adapted to fasten said saddle on a pipe, an arm integral with said saddle extending laterally therefrom, said arm having a non-cylindrical aperture therein, a threaded rod having a non-cylindrical end, a first bushing having a non-cylindrical apertured end seating in said aperture in said arm, said non-cylindrical end of said rod stepped in said bushing, a second bushing having a non-cylindrical end seating in said aperture in said other arm, said threaded rod passing through said second bushing, and a nut threaded on said rod between said arms adapted to bear against said second bushing.

3. In a tool for separating frozen pipe joints, a pair of clamps adapted to be affixed to a pipe, said clamps each having an arm projecting therefrom, said arms having non-cylindrical apertures of the same configuration, a threaded rod having a non-cylindrical end, a first bushing having a non-cylindrical apertured end adapted to seat in an aperture in one of said arms, said non-cylindrical end of said rod stepped in said first bushing, a second bushing having a non-cylindrical end seating in said aperture in said other arm, said threaded rod passing through said second bushing, and a nut threaded on said rod between said arms adapted to bear against said second bushing.

ROSS J. COOPER.

REFERENCES CITED

The following references are of record in the file of this patent:

UNITED STATES PATENTS

| Number | Name | Date |
|---|---|---|
| 1,326,426 | Shea | Dec. 30, 1919 |
| 1,650,316 | Bell, Sr., et al. | Nov. 22, 1927 |
| 1,787,858 | Gray | Jan. 6, 1931 |

FOREIGN PATENTS

| Number | Country | Date |
|---|---|---|
| 1,838 | Austria | Aug. 10, 1900 |
| 182,859 | Germany | Apr. 2, 1907 |
| 358,503 | Germany | Sept. 11, 1922 |
| 369,693 | Germany | Feb. 22, 1923 |